United States Patent
Wirola et al.

(10) Patent No.: US 9,715,002 B2
(45) Date of Patent: Jul. 25, 2017

(54) METHOD AND APPARATUS FOR UPDATING RADIO MAPS

(71) Applicant: HERE Global B.V., Eindhoven (NL)

(72) Inventors: Lauri Wirola, Tampere (FI); Laura Wirola, Tampere (FI); Jari Syrjarinne, Tampere (FI); Mikko Blomqvist, Lempäälä (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/907,634

(22) PCT Filed: Jul. 16, 2014

(86) PCT No.: PCT/EP2014/065202
§ 371 (c)(1),
(2) Date: Jan. 26, 2016

(87) PCT Pub. No.: WO2015/014612
PCT Pub. Date: Feb. 5, 2015

(65) Prior Publication Data
US 2016/0161593 A1 Jun. 9, 2016

(30) Foreign Application Priority Data
Jul. 29, 2013 (FI) .................................. 20135797

(51) Int. Cl.
*H04W 64/00* (2009.01)
*H04W 4/02* (2009.01)
*G01S 5/02* (2010.01)

(52) U.S. Cl.
CPC ......... *G01S 5/0252* (2013.01); *H04W 64/003* (2013.01)

(58) Field of Classification Search
CPC ..... H04W 64/00; H04W 16/18; H04W 24/00; H04W 24/02; H04W 48/20; H04W 4/06; G01C 21/32; G01S 5/02; G01S 5/0252
USPC .............................................. 455/456.1–457
See application file for complete search history.

(56) References Cited

U.S. PATENT DOCUMENTS 6,546,334 B1 * 4/2003 Fukuchi ................. G01C 21/26
342/357.31
2012/0170560 A1 7/2012 Han et al.

FOREIGN PATENT DOCUMENTS

| CN | 1570565 A | 1/2005 |
| CN | 1818562 A | 8/2006 |
| CN | 1818563 A | 8/2006 |

OTHER PUBLICATIONS

International Search Report and Written Opinion in PCT/EP2014/065202, mailed Oct. 29, 2014.
(Continued)

*Primary Examiner* — Allahyar Kasraian
(74) *Attorney, Agent, or Firm* — Lempia Summerfield Katz LLC

(57) ABSTRACT

In accordance with an example embodiment of the present invention, an apparatus comprises a first receiver configured to receive a first partial radio map and a second partial radio map, a processor configured to compare the first partial radio map and the second partial radio map, and the processor further configured to determine to replace the first partial radio map with the second partial radio map based at least in part on a result of the comparison.

14 Claims, 4 Drawing Sheets

(56) References Cited

OTHER PUBLICATIONS

Chinese Office Action for related Chinese Application No. 201480043159.X dated Dec. 27, 2016, with English Translation.

* cited by examiner

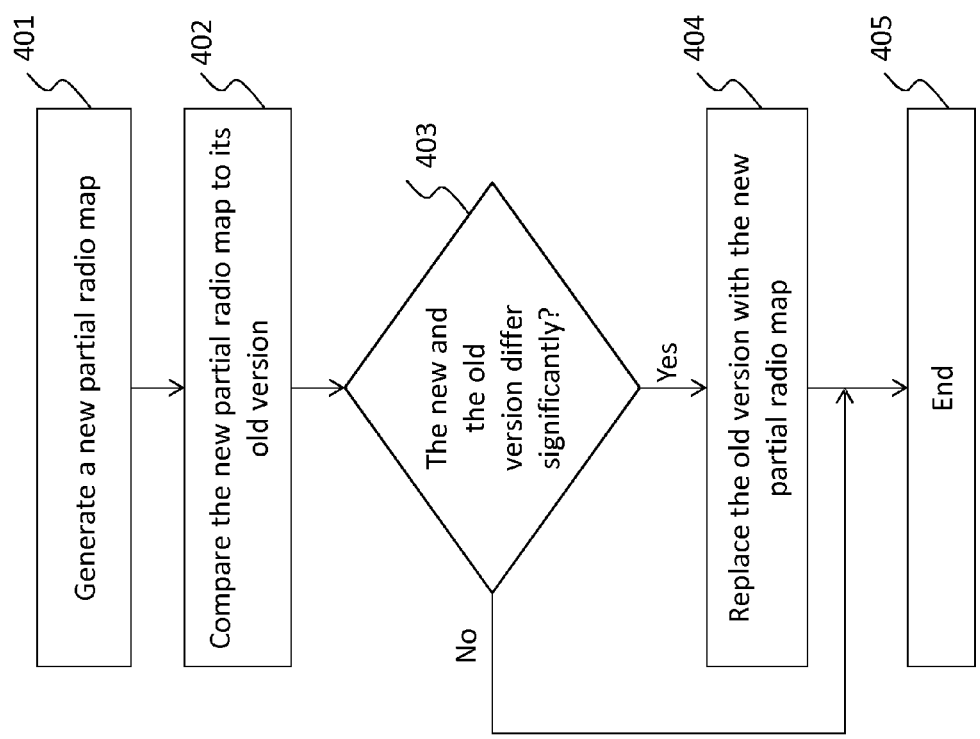

METHOD AND APPARATUS FOR UPDATING RADIO MAPS

This application is filed under 35 U.S.C. 371 claiming benefit of PCT Application No. PCT/EP2014/065202, filed on Jul. 16, 2014, which claims the benefit of FI20135797, filed on Jul. 29, 2013, the contents of each of which are incorporated herein by reference.

TECHNICAL FIELD

The present application relates generally to updating radio maps.

BACKGROUND

Modern global cellular and non-cellular positioning technologies are based on generating large global databases containing information on cellular and non-cellular signals. The information may originate entirely or partially from users of these positioning technologies. This approach may also be referred to as "crowd-sourcing".

Information provided by users may be in the form of "fingerprints", which contain a location that is estimated based on, for example, received satellite signals of a global navigation satellite system, GNSS, and measurements taken from one or more radio interfaces for signals of a cellular and/or non-cellular terrestrial system. A location may comprise an area surrounding a geographical position, for example. In the case of measurements on cellular signals, the results of the measurements may contain a global and/or local identification of the cellular network cells observed, their signal strengths and/or path losses and/or timing measurements like timing advance, TA, or round-trip time. For measurements on wireless local area network, WLAN, signals, as an example of signals of a non-cellular system, the results of the measurements may contain at least one of a basic service set identification, BSSID, like the medium access control, MAC, address of observed access points, APs, the service set identifier, SSID, of the access points, and the signal strengths of received signals. A received signal strength indication, RSSI, or physical reception level may be expressed in dBm units with a reference value of 1 mW, for example.

Such data may then be transferred to a server or cloud, where the data may be collected and where further models may be generated based on the data for positioning purposes. Such further models can be coverage area estimates, communication node positions and/or radio channel models, with base stations of cellular communication networks and access points of WLANs being exemplary communication nodes. In the end, these refined models, also known as radio maps, RM, may be used for estimating the position of mobile terminals.

Fingerprints do not necessarily have to comprise a GNSS based position. They may also include cellular and/or WLAN measurements only. In this case the fingerprint could be assigned a position for example based on a WLAN based positioning in a server. Such self-positioned fingerprints can be used to learn cellular network information, in case there are cellular measurements in the fingerprint. Moreover, in a set of WLAN measurements in a fingerprint there may be, in addition to measurements for known WLAN access points, also measurements for unknown access points and the position of the unknown access points can be learned through these self-positioned fingerprints. Finally, more data can be learnt of previously known access points based on self-positioned fingerprints.

It may be noted that even when using a mobile terminal having GNSS-capabilities, a user may benefit from using cellular/non-cellular positioning technologies in terms of time-to-first-fix and power consumption. Also, not all applications require a GNSS-based position. Furthermore, cellular/non-cellular positioning technologies work indoors as well, which is generally a challenging environment for GNSS-based technologies.

SUMMARY

Various aspects of examples of the invention are set out in the claims.

According to a first aspect of the present invention, an apparatus comprises a first receiver configured to receive a first partial radio map and a second partial radio map, a processor configured to compare the first partial radio map and the second partial radio map, and the processor further configured to determine to replace the first partial radio map with the second partial radio map based at least in part on a result of the comparison.

According to a second aspect of the present invention, a method comprises comparing a first partial radio map and a second partial radio map, and determining to replace the first partial radio map with the second partial radio map based at least in part on a result of the comparison.

According to further aspects of the present invention, computer programs are provided that are configured to cause methods in accordance with the second aspect to be performed.

BRIEF DESCRIPTION OF THE DRAWINGS

For a more complete understanding of example embodiments of the present invention, reference is now made to the following descriptions taken in connection with the accompanying drawings in which:

FIG. 4 is a flow diagram showing operations for updating radio maps in accordance with at least one embodiment of the invention.

DETAILED DESCRIPTION OF THE DRAWINGS

Figure 1:
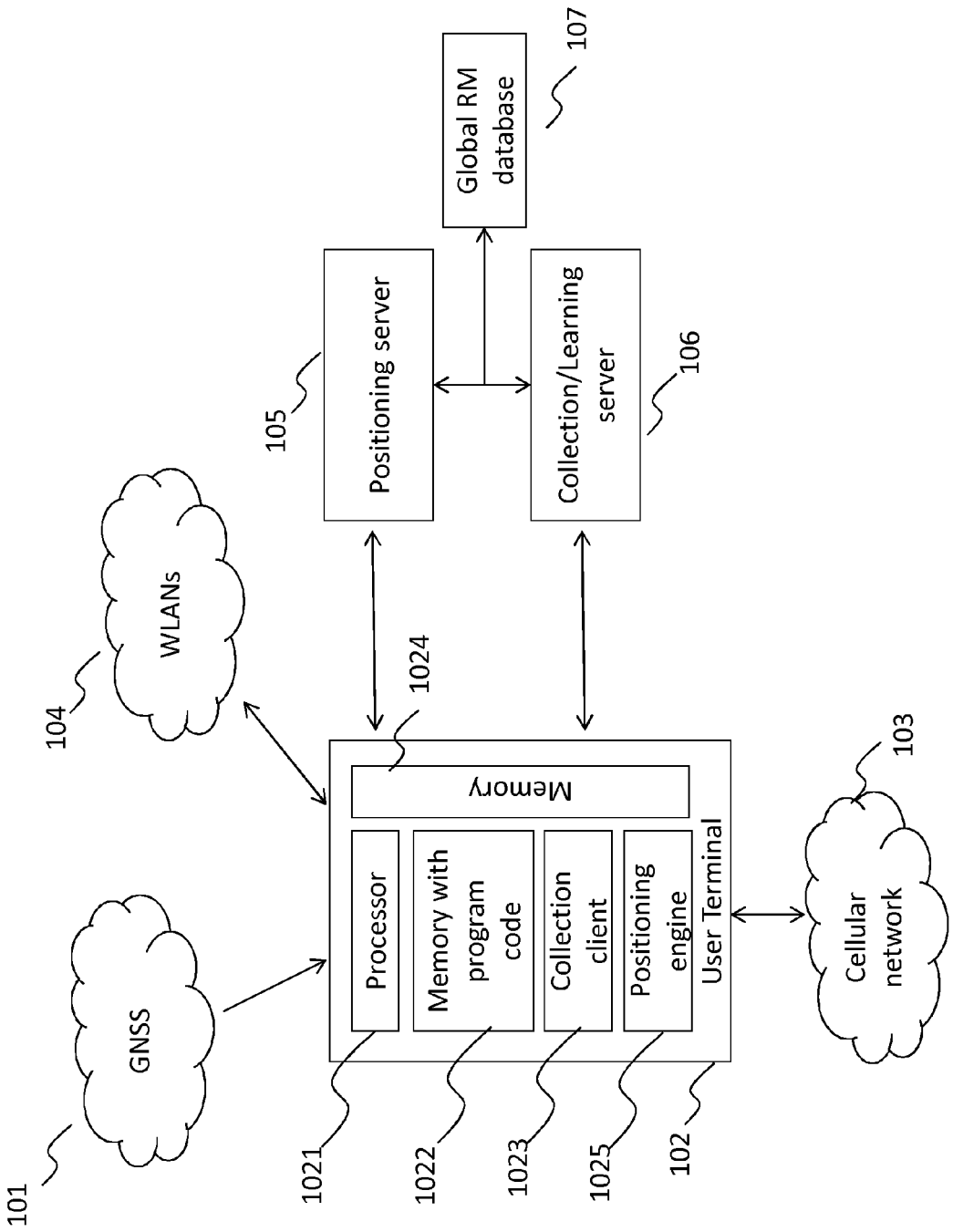
FIG. 1 shows an example architecture of a positioning system.

Positioning systems may function in two modes. The first mode is a terminal-assisted mode, in which a terminal performs measurements of cellular and/or non-cellular air interface signals and provides results of the measurements to a positioning server hosting a global cellular and/or non-cellular RM database. The server then provides a position estimate back to the terminal. This methodology is called online positioning and requires the terminal to have data connectivity whenever positioning service is needed.

The second mode is a terminal-based mode, an offline positioning technique, in which a terminal has a local copy of a RM, called a partial RM. This partial RM is a subset of the global RM in form of WLAN RM offline files, for example. These files may be in the form of a database or any other form that is readable by a computer. There may be multiple such files, since it may be advantageous not to have a single global file, but several smaller ones so that the terminal may only download partial RM for a specific area, for example, a country or a city where a need for positioning is anticipated. This subset can also be pre-installed on the terminal. Offline positioning techniques do not require the terminal to have data connectivity whenever positioning service is needed.

Offline positioning may be advantageous from a service perspective because it helps reduce load on positioning servers. Also, since the terminals are capable of positioning themselves without contacting a positioning server, the terminals may remain location aware all the time. Additionally, time-to-first-fix may be very short, since the device does not need to contact the server.

WLAN RM offline files can be very large in size. As an example, in an urban/suburban area covering roughly 10×10 km, there can be more than 10 million APs. This results in an average density of one AP every 10 $m^2$ or 400,000 APs per 2×2 km tile. Transferring location information for each of these APs from a server to a terminal consumes a lot of server resources, network bandwidth, storage space in the terminal and it can also be quite expensive to the consumer in the form of data charges. Hence, it may be preferable to have small WLAN RM offline files. In addition, a WLAN AP environment may be highly dynamic and new APs may appear, existing APs may become obsolete and AP locations may change, for example. Resultantly, radio maps installed on a device may need to be refreshed, possibly more than once.

To reduce size of a radio map and corresponding WLAN RM offline files, those APs which do not significantly affect accuracy and availability of a radio map may be excluded from the radio map. Availability of a positioning system is defined as the ratio of the number of successful positioning events to the total number of positioning requests. It can be appreciated that both accuracy and availability are important metrics affecting user experience. A further reduction in size of a partial radio map file can be achieved by compressing identifiers of AP comprised in the partial radio map into a smaller number of bits by utilizing a digital compression algorithm. But even after excluding APs from a partial radio map and utilizing compressed AP identifiers, sizes of partial radio map files may still be prohibitively big for frequent downloads by user terminals. Thus, it may be desirable to avoid downloading a newer version of a partial radio map to a user terminal, unless it's necessary for maintaining an acceptable level of accuracy and availability in offline positioning.

Embodiments of the present invention relate to comparing a new and a previous version of a partial radio map and determining based upon the comparison, if a new radio map should be published for positioning clients, such as user terminals, to download. Based upon the comparison, only if significant changes have taken place in a radio map environment, the new version of the partial radio map is published on a download server for positioning clients to download. Otherwise, positioning clients are allowed to use an older version if the reduction in performance of the older radio map compared to its newer version is expected to be insignificant.

FIG. 1 shows an example architecture of a positioning system. The positioning system of FIG. 1 comprises a GNSS 101, a user terminal 102, a cellular network 103, WLAN systems 104, a positioning server 105, a collection/learning server 106 and a global RM database 107. Positioning server 105 and collection/learning server 106 may be co-located in a single site or apparatus, or alternatively they may be distinct in the sense that positioning server 105 is external to collection/learning server 106 and collection/learning server 106 is external to positioning server 105. Global RM database may be a standalone node, or it may be comprised in collection/learning server 106 and/or positioning server 105. The user terminal 102 may receive its GNSS based position from the GNSS 101. The GNSS 101 could be GPS, GLONASS or any other satellite based navigation system. The user terminal may also receive radio signals from the cellular network 103. The cellular network 103 could be based on any kind of cellular system, for instance a GSM system, a 3rd Generation Partnership Project, 3GPP, based cellular system like a WCDMA system or a time division synchronous CDMA, TD-SCDMA, system, for example supporting high speed packet access, HSPA, a 3GPP2 system like a CDMA2000 system, a long term evolution, LTE, or LTE-Advanced system, or any other type of cellular system, like a WiMAX system. Cellular network 103 comprises a plurality of base stations or base transceiver stations as communication nodes. Furthermore, user terminal 102 may also receive signals from WLANs 104. WLANs 104 comprise at least one access point as a communication node. WLANs 104 may be based upon the IEEE 802.11 standards, for example.

The user terminal 102 comprises a processor 1021, and linked to the processor, a memory 1022. Memory 1022 stores computer program code in order to cause the user terminal 102 to perform desired actions. Processor 1021 is configured to execute computer program code stored in memory 1022. The user terminal further comprises memory 1024 to store additional data such as, for example, partial RMs. The user terminal may further include at least one antenna in communication with at least one transmitter and at least one receiver to enable communication with the GNSS 101, cellular network 103, WLANs 104, positioning server 105 and/or collection/learning server 106. The mobile terminal processor 1021 may be configured to provide signals to and receive signals from the at least one transmitter and the at least one receiver, respectively.

Although not shown, the user terminal 102 may also include one or more other structure configured to share and/or obtain data. For example, the apparatus may comprise a short-range radio frequency, RF, transceiver and/or interrogator so data may be shared with and/or obtained from electronic devices in accordance with RF techniques. The user terminal may comprise other short-range transceivers, such as, for example, an infrared, IR, transceiver, a Bluetooth™, BT, transceiver operating using Bluetooth™ brand wireless technology developed by the Bluetooth™ Special Interest Group, a wireless universal serial bus, USB, transceiver and/or the like. The Bluetooth™ transceiver may be capable of operating according to low power or ultra-low power Bluetooth™ technology, for example, Bluetooth low energy, radio standards. In this regard, the user terminal 102 and, in particular, the short-range transceiver may be capable of transmitting data to and/or receiving data from electronic devices within proximity of the apparatus, such as within 10 meters, for example. The apparatus may be capable of transmitting and/or receiving data from electronic devices according to various wireless networking techniques, including 6LoWpan, Wi-Fi, Wi-Fi low power, IEEE 802.15 techniques, IEEE 802.16 techniques, and/or the like.

The user terminal 102 may further comprise a collection client 1023. Collection client 1023 may comprise, for example, a software module stored in memory 1022, or in another memory comprised in user terminal 102. The collection client 1023 may be configured to collect information comprising at least one of the following to be sent to the collection/learning server 106:

An estimate of the user terminal's location based on, for example, received satellite signals of the GNSS 101

Measurements taken from signals of the cellular network 103.

Results of scanning for WLAN systems 104.

Results of scanning for other short range radio signals.

The collection/learning server 106 receives this information and based on it, builds a database of AP locations and coverage areas of cellular base stations and APs, such as for example WLAN APs. Such a database may be called a global RM database 107 since the RMs stored in this database may not be specific to a country or a city, or more generally to a specific locality. Rather, they may be global in nature. In some embodiments, collection/learning server 106 is configured to build a database of AP locations that does not comprise information on coverage areas of cellular base stations.

Once a reliable global RM database 107 is built, the positioning server 105 may serve online positioning requests from user terminals. A user terminal may take measurements of signals from cellular networks and/or perform WLAN scans and send them to the positioning server 105. The positioning server may refer to the global RM database and based at least in part upon the information provided by the user terminal, provide an estimate of the user terminal position.

If a data connection between the positioning server and a user terminal is unavailable or is undesirable, the terminal may rely on the positioning engine 1025 to serve positioning requests offline. A partial RM or a subset of the global RM in form of RM offline files, such as for example WLAN offline files, may be stored in the memory 1024 of the user terminal. With a partial RM pertaining to the area in which a user terminal is presently located stored in a memory of the user terminal, the user terminal may scan the WLANs and/or signals from cellular networks at its location and provide a list of observed AP identifiers and/or base station identities to the positioning engine 1025. After consulting a partial RM stored in the user terminal 102 and based upon the observed AP identifiers and/or the base station identities, the positioning engine 1025 may estimate a location of the user terminal without sending a request to a positioning server. It should be noted that partial RMs may be based upon access points of short range wireless systems other than WLAN systems and a user terminal may scan for signals from at least one of these other short range wireless systems to estimate its position.

Figure 2:
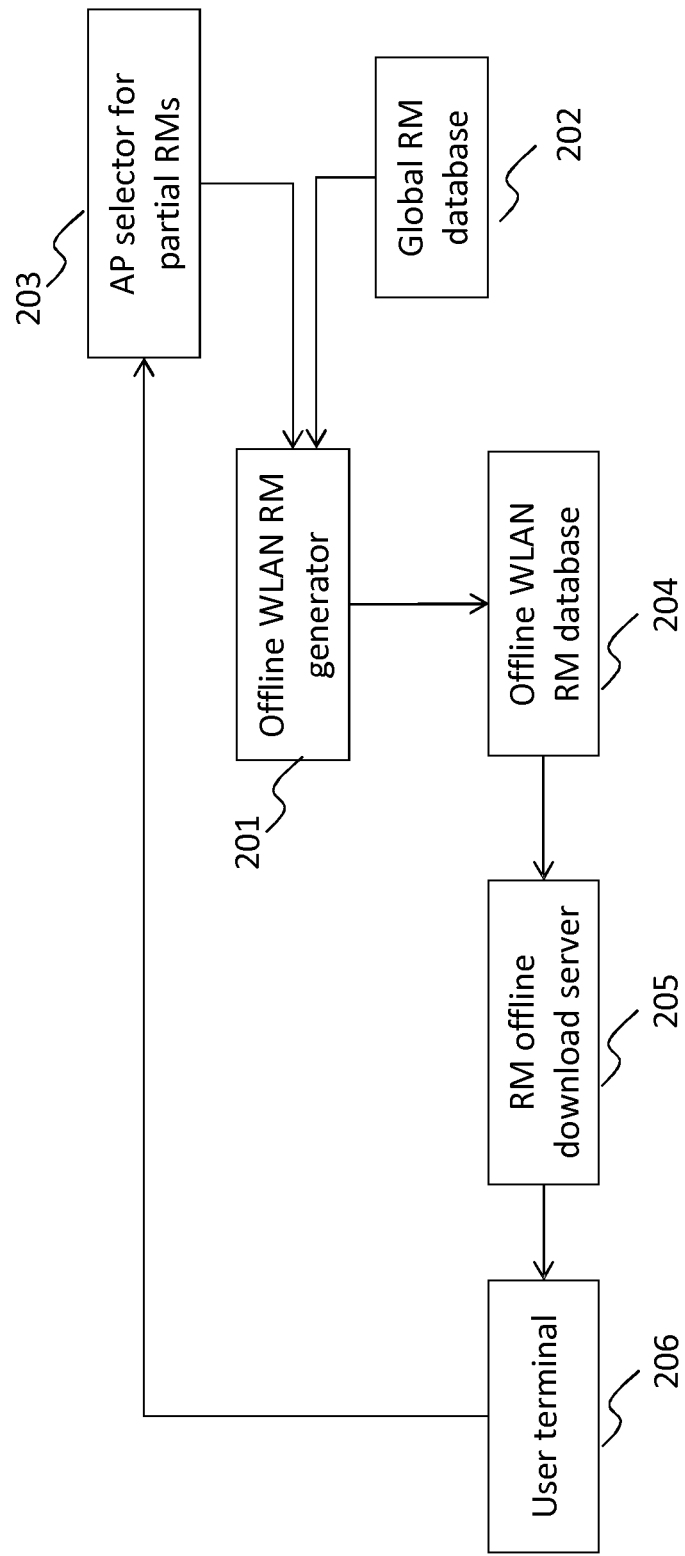
FIG. 2 shows an example system for generating and distributing partial RMs for offline usage in user terminals.

FIG. 2 shows an example system for generating and distributing partial RMs for offline usage in user terminals. In accordance with an embodiment of the present invention, an offline WLAN RM generator, OW-RMG, 201 takes as inputs a global RM from a global database 202 and a list of WLAN APs to be included in a partial RM from an AP selector for partial RMs 203. In order to reduce a size of a partial RM, it is desirable to include only a subset of all APs in a partial RM to be stored on a user terminal. The AP selector for partial RMs 203 helps achieve this goal by identifying APs which are relevant to the performance of partial RMs. The AP selector for partial RMs 203 may comprise a memory. The selection of APs by the AP selector for partial RMs 203 may be based at least in part on the inputs provided by a user terminal 206. The OW-RMG 201 may further refine the list of APs received from the selector 203 based upon a set of at least one criterion. The OW-RMG 201 may compress identifiers of a subset of APs in order to reduce a size of a partial RM file. The OW-RMG 201 generates partial RMs based at least in part upon these inputs and transfers them for storage to the offline WLAN RM database 204. The partial RMs needed by the user terminal 206 are then transferred by the offline WLAN RM database 204 to the RM offline download server 205. In an embodiment of the invention, after transferring a partial RM to the RM offline download server 205, the OW-RMG 201 may generate a newer version of the transferred partial RM. This newer version may be generated after a predetermined period of time has lapsed after generation of the transferred partial RM, for example. The OW-RMG 201 may compare the transferred partial RM and the newer version and if the newer partial RM is significantly different, the OW-RMG 201 may transfer the newer partial RM to the RM offline download server 205 for download by a positioning client, such as user terminal 206, for example.

In an embodiment of the invention, the offline WLAN RM database 204 may be absent and a partial RM file may be transmitted directly from the OW-RMG 201 to the RM offline download server 205. From the download server, a partial RM file may be downloaded by the user terminal 206 or any other user terminal. The user terminal may have the structure and circuitry of user terminal 102 of FIG. 1, for example. The user terminal may include at least one antenna in communication with at least one transmitter and at least one receiver to enable communication with the download server. Similarly, the download server may include at least one antenna in communication with at least one transmitter and at least one receiver to enable communication with the user terminal. The download server may further include a processor configured to provide signals to and receive signals from the transmitter and receiver, respectively.

Global RM database 202, AP selector for partial RMs 203, Offline WLAN RM generator 201, Offline WLAN RM database 204 and RM offline download server 205 may be implemented as standalone nodes in a network, or alternatively at least two and optionally even all of them may be implemented as functions in a single physical server.

Figure 3:
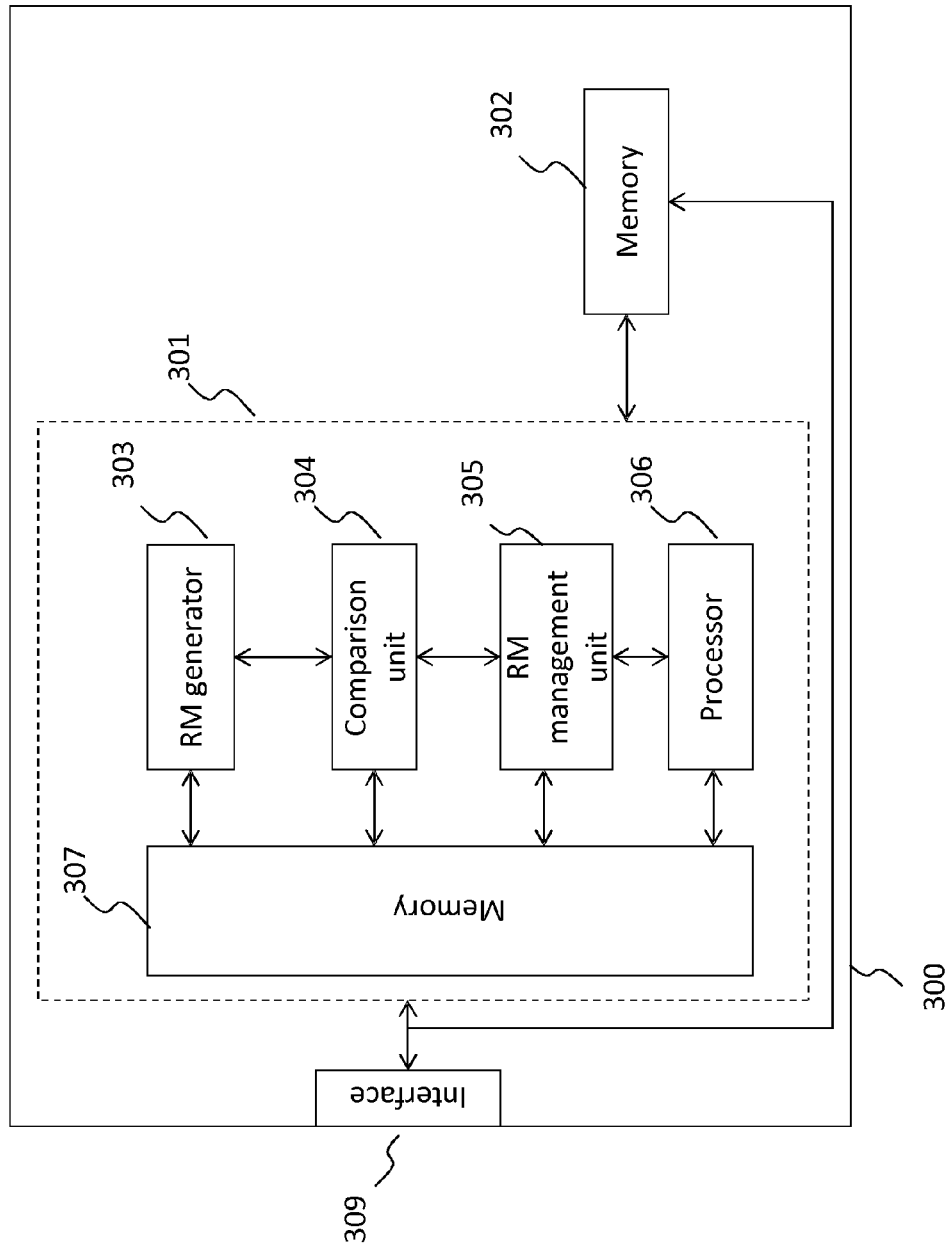
FIG. 3 shows an apparatus embodying a process for updating radio maps according to an example embodiment of the invention.

FIG. 3 shows an apparatus embodying a process for updating a partial RM according to an example embodiment of the invention. As an example, apparatus 300 may be comprised in the OW-RMG 201 of FIG. 2. Apparatus 300 comprises processors 301, 303, 304, 305, 306 and, linked to these processors, a memory 307. The processors 301, 303, 304, 305, 306 may, for example, be embodied as various means including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit, ASIC, or field programmable gate array, FPGA, or some combination thereof. A processor comprising exactly one processing core may be referred to as a single-core processor, while a processor comprising more than one processing core may be referred to as a multi-core processor. Accordingly, although illustrated in FIG. 3 as single processors, in some embodiments the processors 303, 304, 305, 306 may comprise a plurality of processors or processing cores. Similarly, processors 303, 304, 305, 306 may be embodied within one processor 301. In some embodiments, at least one of processors 303, 304, 305 and 306 are implemented at least in part in software, which software may be run on processor 301. Memory 307 stores computer program code for supporting updating a partial RM. Processors 301, 303, 304, 305, 306 are configured to execute computer program code stored in memory 307 in order to cause the apparatus to perform desired actions. Apparatus 300 further comprises memory 302. Memory 302 may be used, at least in part, to store input data needed for operations of the apparatus 300 or output data resulting from operation of the apparatus 300. Apparatus 300 could be comprised in a server or any other suitable device. Apparatus 300 could equally be a module, like a chip, circuitry on a chip or a plug-in board, for use in a server or for any other device. Optionally, apparatus 300 could comprise various other components, such as for example at least one of a user interface, a further memory and a further processor. Memory 302 and memory 307 may be distinct memories, or alternatively memory 307 may be comprised in memory 302, or memory 302 may be comprised in memory 307.

The RM generator 303 may generate a partial RM corresponding to a predetermined geographical area, based at least in part on a predetermined criterion. The predetermined criterion may be that a predetermined time period has elapsed since a partial RM corresponding to the geographical area was generated, for example. In some embodiments of the invention, the predetermined criterion may be that a change has occurred in a WLAN or cellular environment of the geographical area corresponding to the partial RM. A change in a WLAN environment may be an increase in a number of APs, a decrease in a number of APs or a change in location of APs, for example. A change in a cellular environment may comprise, for example, a changed geographical arrangement of base stations or base station identitites. The RM generator may transfer the generated partial RM to the comparison unit 304 or it may store the generated partial RM in a memory comprised in the apparatus 300, such as memory 302, for example.

The comparison unit 304 receives the partial RM generated by the RM generator 303. The comparison unit 304 may receive the partial RM from the RM generator 303 or it may obtain it from a memory, such as memory 302, for example. The comparison unit 303 also receives a previous version of the generated RM. A previous version of the generated partial RM may be a partial RM corresponding to the geographical area of the generated partial RM but which was generated prior to more than a predetermined time interval, for example. In another embodiment of the invention, a previous version of the generated RM may be a RM that corresponds to the geographical area of the partial RM generated by the RM generator 303 but which was generated before a change took place in a WLAN environment of the geographical area. A change in a WLAN environment may be an increase in a number of, a decrease in a number of APs or a change in location of one or more APs, for example. The comparison unit 304 may receive the previous version of the RM from the interface 309 or from a memory comprised within the apparatus 300, such as memory 302, for example.

Interface 309, which may be a data interface, may receive the previous version of the partial RM from a database such as offline WLAN RM database 204 of FIG. 2, for example. Once received by the interface 309, the previous version of the partial RM may be stored in a memory comprised within apparatus 300, such as memory 302 or memory 307, for example.

The comparison unit 304 compares the partial RM generated by the RM generator 303 and a previous version of the generated partial RM. Based upon a comparison of the generated partial RM and the previous version of the generated partial RM, the comparison unit 304 may determine at least one of the following statistics:
Number of APs which are comprised in the previous version of the generated partial RM but are not comprised in the generated partial RM.
Number of APs which are not comprised in the previous version of the generated partial RM but are comprised in the generated partial RM.
Number of APs with substantially different locations in the previous version of the generated partial RM and the generated partial RM. Herein, two locations are said to be substantially different if a distance between the two locations is more than a threshold. In other words, APs have moved.
If the geographical area is mapped to a grid comprising nodes, a number of access points that are assigned to at least one node in the previous version of the generated partial RM but are not assigned to the at least one node in the generated partial RM.
If the geographical area is mapped to a grid comprising nodes, a number of access points that are assigned to at least one node in the generated RM but are not assigned to the at least one node in the previous version of the generated partial RM.

Based upon at least on of the statistics, the comparison unit 304 makes a determination of whether the generated partial RM should replace its previous version. The determination to replace the previous version of the generated partial RM by the partial RM generated by the RM generator 303 may be made if at least one of the following conditions is true:
Number of APs which are comprised in the previous version of the generated partial RM but are not comprised in the generated partial RM exceeds a threshold value.
Number of APs which are not comprised in the previous version of the generated partial RM but are comprised in the generated partial RM exceeds a threshold value.
Number of APs with substantially different locations in the previous version of the generated partial RM and the generated partial RM exceeds a threshold value. This may correspond to a number of APs that have moved.
If the geographical area is mapped to a grid comprising nodes, a number of access points that are assigned to at least one node in the previous version of the generated partial RM but are not assigned to the at least one node in the generated partial RM exceeds a threshold value.
If the geographical area is mapped to a grid comprising nodes, a number of access points that are assigned to at least one node in the generated RM but are not assigned to the at least one node in the previous version of the generated partial RM exceeds a threshold value.

The RM management unit 305 obtains the determination made by the comparison unit 304. The determination may be transmitted from the comparison unit 304 to the RM management unit 305 or it may be stored in a memory location by the comparison unit 304 and may be obtained from the memory by the RM management unit 305. In case the comparison unit 304 determines not to replace the previous version of the generated partial RM, the RM management unit takes no further action. In case the comparison unit determines to replace the previous version of the generated partial RM, the RM management unit 305 may replace the previous version of the generated partial RM with the partial RM generated by the RM generator 303 in at least one database. The at least one database may be comprised in the offline WLAN RM database 204 of FIG. 2 or in RM offline download server 205 of FIG. 2, for example. The RM management unit 305 may also cause a notification to be transmitted to a user terminal, such as user terminal 206 of FIG. 2, notifying that a new version of a partial RM is available.

Note that other statistics can also be utilized and the invention is not restricted to statistics described herein.

FIG. 4 is a flow diagram showing operations for updating radio maps in accordance with at least one embodiment of the invention. The method may be executed by an apparatus, such as apparatus 300 of FIG. 3, for example. In step 401, a new version of a previously generated partial RM is generated. The previously generated partial RM may be called an old version of the partial RM. Generation of the new version may be triggered based at least in part on a predetermined criterion. The predetermined criterion may be that a predetermined time period has elapsed since the old version was generated, for example. In some embodiments of the invention, the predetermined criterion may be that a change has occurred in a WLAN environment of a geographical area corresponding to the partial RM. A change may be an increase in a number of APs, a decrease in a number of APs or a change in location of APs, for example.

In step 402, a comparison is made between the new version of the partial RM and the old version. The comparison may involve determination of at least one of the following statistics:

- Number of APs which are comprised in the old version of the partial RM but are not comprised in the new version partial RM.
- Number of APs which are not comprised in the old version of the partial RM but are comprised in the new version of the partial RM.
- Number of APs with a substantially different location in the old version of the partial RM and the new version of the partial RM. Herein, two locations are said to be substantially different if a distance between the two locations is more than a threshold. This may correspond to a number of APs that have moved.
- If the geographical area is mapped to a grid comprising nodes, a number of access points that are assigned to at least one node in the old version of the generated partial RM but are not assigned to the at least one node in the new version of the partial RM.
- If the geographical area is mapped to a grid comprising nodes, a number of access points that are assigned to at least one node in the new version of the partial RM but are not assigned to the at least one node in the old version of the partial RM.

Based upon the statistics determined in step 402, a determination is made in step 403 as to whether the new version of the partial RM should replace the old version. The determination to replace the old version of the partial RM by the new version may be made if the new and the old versions differ significantly. In an embodiment of the invention, the old and the new versions are determined to differ significantly if at least one of the following conditions is true:

- Number of APs which are comprised in the old version of the partial RM but are not comprised in the new version of the partial RM exceeds a threshold value.
- Number of APs which are not comprised in the old version of the partial RM but are comprised in the new version of the partial RM exceeds a threshold value.
- Number of APs with substantially different locations in the old version of the partial RM and the new version of the partial RM exceeds a threshold value. Herein, two locations are said to be substantially different if a distance between the two locations is more than a threshold.
- If the geographical area is mapped to a grid comprising nodes, a number of access points that are assigned to at least one node in the previous version of the generated partial RM but are not assigned to the at least one node in the new version of the partial RM exceeds a threshold value.
- If the geographical area is mapped to a grid comprising nodes, a number of access points that are assigned to at least one node in the new version of the partial RM but are not assigned to the at least one node in the old version of the generated partial RM exceeds a threshold value.

If in step 403, it is determined that the old version and the new version of the partial RM do not differ significantly, the process proceeds to step 405 and ends. However, if in step 403, it is determined that the old and the new versions of the partial RM differ significantly, then the process moves to step 404. In step 404, the old version of the partial RM is replaced with the new version in at least one database of a positioning system. The at least one database may be comprised in a RM database, such as the WLAN RM database 204 of FIG. 2 or it may be comprised in a download server, such as RM offline download server 205 of FIG. 2, for example. In some embodiments of the invention, in step 404, a notification may be sent to a user terminal, such as user terminal 206 of FIG. 2, notifying that the new version of the partial RM is available.

Note that other statistics can also be utilized and the invention is not restricted to statistics described herein. Also, another embodiment of the invention, the process of FIG. 4 may be repeated for other partial RMs in the positioning system. In yet another embodiment of the invention, significant changes between a new an old version of a partial RM may be used as an indication that at least component in the positioning system is malfunctioning.

If desired, the different functions discussed herein may be performed in a different order and/or concurrently with each other. Furthermore, if desired, one or more of the above-described functions may be optional or may be combined.

Without in any way limiting the scope, interpretation, or application of the claims appearing below, a technical effect of one or more of the example embodiments disclosed herein is to reduce a number of times a partial RM needs to be downloaded by a user terminal. Another technical effect of one or more of the example embodiments disclosed herein is to replace an old partial RM with its new version only if the new version is significantly different from the old version.

Embodiments of the present invention may be implemented in software, hardware, application logic or a combination of software, hardware and application logic. The software, application logic and/or hardware may reside on memory 307, the processor 301 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 3. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, performed by at least one apparatus, the method comprising:
   comparing, performed by a processor of the at least one apparatus, a first partial radio map and a second partial radio map;
   determining, performed by the processor, to replace the first partial radio map with the second partial radio map based at least in part on a result of the comparison,
   wherein the comparing comprises determining a first number of access points that are included in the first partial radio map but not included in the second partial radio map,
   wherein the first partial radio map is determined to be replaced with the second partial radio map if the first number of access points exceeds a threshold.

2. The method of claim 1, wherein the comparing comprises:
   determining a second number of access points that are not included in the first partial radio map but are included in the second partial radio map;
   wherein the first partial radio map is determined to be replaced with the second partial radio map if the second number of access points exceeds a threshold.

3. The method of claim 1, wherein the comparing comprises:
   determining a number of access points with different locations in the first partial radio map and the second partial radio map;
   wherein the first partial radio map is determined to be replaced with the second partial radio map if a number of access points with different locations in the first partial radio map and the second partial radio map exceeds a threshold.

4. The method of claim 1, further comprising:
   receiving, performed by a receiver of the at least one apparatus, a mapping of access points in the first partial radio map and access points in the second partial radio map to at least one node in a grid;
   wherein the comparing comprises:
      determining a third number of access points that are assigned to the at least one node in the first partial radio map but are not assigned to the at least one node in the second partial radio map; and
   wherein the first partial radio map is determined to be replaced with the second partial radio map if the third number of access points exceeds a threshold.

5. The method of claim 1, further comprising
   receiving, performed by a receiver of the at least one apparatus, a mapping of access points in the first partial radio map and access points in the second partial radio map to at least one node in a grid;
   wherein the comparing comprises:
   determining a fourth number of access points that are assigned to the at least one node in the second partial radio map but are not assigned to the at least one node in the first partial radio map; and
   wherein the first partial radio map is determined to be replaced with the second partial radio map if the fourth number of access points exceeds a threshold.

6. The method of claim 1, wherein the first partial radio map and the second partial radio map comprise radio maps of a same geographical area corresponding to different time periods.

7. An apparatus, comprising:
   at least one processor; and
   at least one memory including computer program code the at least one memory and the computer program code configured to, with the at least one processor, cause the apparatus to perform at least the following:
   comparing a first partial radio map and a second partial radio map; and
   determining to replace the first partial radio map with the second partial radio map based at least in part on a result of the comparison,
   wherein the comparing comprises determining a first number of access points that are included in the first partial radio map but not included in the second partial radio map, and
   wherein the at least one processor is further configured to cause the first partial radio map to be replaced with the second partial radio map if the first number of access points exceeds a threshold.

8. The apparatus of claim 7, wherein the comparing comprises:
   determining a second number of access points that are not included in the first partial radio map but are included in the second partial radio map; and
   wherein the at least one processor is further configured to cause the first partial radio map to be replaced with the second partial radio map if the second number of access points exceeds a threshold.

9. The apparatus of claim 7, wherein the comparing comprises:
   determining a number of access points with different locations in the first partial radio map and the second partial radio map; and
   wherein the at least one processor is further configured to cause the first partial radio map to be replaced with the second partial radio map if the number of access points with different locations in the first partial radio map and the second partial radio map exceeds a threshold.

10. The apparatus of claim 7, further comprising:
    a first receiver configured to receive a first partial radio map and a second partial radio map.

11. The apparatus of claim 10, further comprising:
    a second receiver configured to receive a mapping of access points in the first partial radio map and access points in the second partial radio map to at least one node in a grid;
    wherein the comparing comprises:
       determining a third number of access points that are assigned to the at least one node in the first partial radio map but are not assigned to the at least one node in the second partial radio map; and wherein the at least one processor is further configured to determine to cause the first partial radio map to be replaced with the second partial radio map if the third number of access points exceeds a threshold.

12. The apparatus of claim 10, further comprising:

a second receiver configured to receive a mapping of access points in the first partial radio map and access points in the second partial radio map to at least one node in a grid;

wherein the comparing comprises:

determining a fourth number of access points that are assigned to the at least one node in the second partial radio map but are not assigned to the at least one node in the first partial radio map; and wherein the at least one processor is further configured to cause the first partial radio map to be replaced with the second partial radio map if the fourth number of access points exceeds a threshold.

13. The apparatus claim 7, wherein the first partial radio map and the second partial radio map comprise radio maps of a same geographical area corresponding to different time periods.

14. A non-transitory computer-readable medium encoded with instructions that, when executed by a computer, perform:

comparing a first partial radio map and a second partial radio map; and determining to replace the first partial radio map with the second partial radio map based at least in part on a result of the comparison, wherein the comparing comprises determining a first number of access points that are comprised in the first partial radio map but not comprised in the second partial radio map; and wherein the first partial radio map is determined to be replaced with the second partial radio map if the first number of access points exceeds a threshold.

* * * * *